(No Model.)
C. L. TRIPP.
STRAINING PIN FOR PIANO FORTES.
No. 442,557. Patented Dec. 9, 1890.
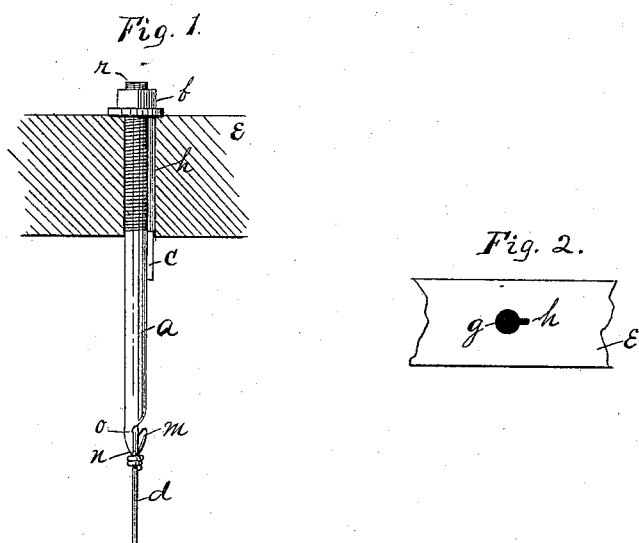

UNITED STATES PATENT OFFICE.

CHESTER L. TRIPP, OF NEW BEDFORD, MASSACHUSETTS.

STRAINING-PIN FOR PIANO-FORTES.

SPECIFICATION forming part of Letters Patent No. 442,557, dated December 9, 1890.

Application filed January 7, 1889. Serial No. 295,707. (No model.)

*To all whom it may concern:*

Be it known that I, CHESTER L. TRIPP, a citizen of the United States, residing at New Bedford, in the county of Bristol and State of Massachusetts, have invented a new and useful Improvement in Straining-Pins for Piano-Fortes, of which the following is a specification.

My invention is only applicable to that class of pianos in which the string-plate has a straining-abutment projecting at right angles from the same and provided with apertures for the straining-pins in line with the draft of the strings.

My invention is a straining-pin for the above-described class of pianos; and it consists of a round bar of metal provided with a screw-thread in a portion of its length, a wing or projection extending from the side of said bar next contiguous to the screw-threaded portion, a notch in the side of the said bar near the end opposite from the screw-threaded portion adapted to receive the loop in the end of a piano-string, the end of said bar below the said notch brought to a point, and a nut to fit the screw-threaded portion of the bar and bear against the upper side of the straining-abutment.

In the accompanying drawings, Figure 1 is a view in cross-section of the straining-abutment through the apertures made to receive the straining-pins, showing the straining-pin as it appears when in place, with the piano-string attached to its end in a proper manner. Fig. 2 is a plan view of a section of the top of the straining-abutment, showing the groove in the side of the aperture which receives the wing or projection on the side of the straining-pin.

In Fig. 1, *e* represents the straining-abutment of a piano-forte, and *a* represents the straining-pin screw-threaded in a portion of its length and provided with the flanged nut *b*.

*c* represents a wing or projection formed on the pin *a*.

*m* represents a notch formed in the side of the pin and near its lower end adapted to receive the loop *o* of the piano-string *d*. The lower end of the pin below the notch *m* is pointed, as at *n*, so as to conform somewhat to the shape of the loop *o* when under strain and cause the draft of the string to be from the center of the end of the straining-pin.

The operation of the device is as follows: The straining-pin being adjusted, as shown in Fig. 1, with the string *d* attached, the nut *b* is turned to the right and the string *d* drawn to the proper degree of tension. While this is being done the projection *c* follows the groove *h* and prevents the straining-pin from turning with the nut *b*.

Having thus described my invention, what I claim, and desire to secure by Letters Patent, is—

In combination with the string-plate of a piano having a straining-abutment projecting at right angles with said plate and having the aperture for the straining devices in line with the tension of the strings and each provided with a longitudinal groove in the side thereof, a straining-pin consisting of the round bar *a*, having screw-thread *r*, the wing *c*, adapted to engage with the groove *h* in the straining-abutment, the notch *m*, adapted to receive the loop in the end of the piano-string, the pointed end *n*, whereby the piano-string is caused to draw from the center of the end of the pin, and a nut *b*, adapted to engage with the screw-thread *r* and bear against the upper side of the straining-abutment, all as shown and described.

CHESTER L. TRIPP.

Witnesses:
 THOS. M. JAMES,
 HENRY W. MASON.